United States Patent
Palvadi et al.

(10) Patent No.: US 10,332,704 B2
(45) Date of Patent: Jun. 25, 2019

(54) DEVICES, SYSTEMS, AND METHODS FOR PROTECTION OF SWITCHGEAR AGAINST ELECTRICAL ARCS

(71) Applicant: ABB Schweiz AG, Baden (CH)

(72) Inventors: Srinivas Naga Palvadi, Secunderabad (IN); Triloka Chander Tankala, Hyderabad (IN); Karthik Kondaveeti, Piduguralla (IN)

(73) Assignee: ABB Schweiz AG, Baden (CH)

( * ) Notice: Subject to any disclaimer, the term of this patent is extended or adjusted under 35 U.S.C. 154(b) by 404 days.

(21) Appl. No.: 15/132,755

(22) Filed: Apr. 19, 2016

(65) Prior Publication Data

US 2017/0301489 A1    Oct. 19, 2017

(51) Int. Cl.
| | | |
|---|---|---|
| H02H 1/00 | (2006.01) | |
| H02H 3/16 | (2006.01) | |
| H01H 11/00 | (2006.01) | |
| H01H 33/08 | (2006.01) | |

(52) U.S. Cl.
CPC ............ H01H 33/08 (2013.01); H01H 11/00 (2013.01); H02H 1/0015 (2013.01); H02H 3/16 (2013.01)

(58) Field of Classification Search
CPC ...... H01H 11/00; H01H 33/08; H02H 1/0015; H02H 3/16
USPC .......................................................... 361/2
See application file for complete search history.

(56) References Cited

U.S. PATENT DOCUMENTS

| | | |
|---|---|---|
| 5,569,894 A | 10/1996 | Uchida et al. |
| 5,574,624 A | 11/1996 | Rennie et al. |
| 7,391,597 B2 | 6/2008 | Meeks et al. |
| 7,821,749 B2 | 10/2010 | Asokan et al. |
| 8,563,888 B2 | 10/2013 | Bohori et al. |
| 8,922,977 B2 | 12/2014 | Faber |
| 8,981,248 B2 | 3/2015 | Palvadi et al. |
| 8,993,916 B2 | 3/2015 | Palvadi et al. |
| 2014/0110232 A1 | 4/2014 | Gingrich |

(Continued)

FOREIGN PATENT DOCUMENTS

WO    9824159 A2    6/1998

OTHER PUBLICATIONS

Mark Clapper, GE Arc VaultTM Protection System, pp. 1-5, url: http://apps.geindustrial.com/publibrary/checkout/ArcAbsorber?TNR=White%20Papers|ArcAbsorber|generic.

(Continued)

*Primary Examiner* — Kevin J Comber
(74) *Attorney, Agent, or Firm* — Barnes & Thornburg LLP (57) ABSTRACT

An arc protection system for an electrical enclosure having an electrical component positioned in an interior thereof. The system includes two busbars and at least one arc routing device positioned in the interior and an arc containment device defining a cavity and including an electrode assembly positioned within the cavity, wherein the electrode assembly is electrically coupled to the two busbars. The system also includes at least one arc routing device having a first end proximate the electrical component and a second end proximate the arc containment device. The at least one arc routing device is operative to i) attract arc plasma generated during an arc event at the electrical component, and ii) transport the arc plasma to the arc containment device, wherein the arc containment device is configured to transfer electrical energy of the arc plasma to an exterior of the electrical enclosure.

20 Claims, 8 Drawing Sheets

(56) References Cited

U.S. PATENT DOCUMENTS

2014/0160634 A1\* 6/2014 Palvadi ................. H01H 69/00
361/600
2015/0015997 A1\* 1/2015 Faber .................... H02B 11/04
361/2

OTHER PUBLICATIONS

Kim Freeman, Every Millisecond Counts: GE Announces Arc Vault™ System to be Fastest Arc Flash Containment Technology in the Industry, GE Consumer & Industrial, 2015, url: http://www.businesswire.com/news/home/20090914006341/en/Millisecond-Counts-GE-Announces-Arc-Vault%E2%84%A2-System.

\* cited by examiner

DEVICES, SYSTEMS, AND METHODS FOR PROTECTION OF SWITCHGEAR AGAINST ELECTRICAL ARCS

BACKGROUND

The field of the disclosure relates generally to safety devices for electrical switchgear, and, more specifically, to devices, systems, and methods for protection of switchgear and other electrical components against electrical arc events.

In known electrical switchgear, electrical arcs have the potential to release a very large quantum of energy in a very short period of time. Such arc events may render switchgear and associated equipment unusable. Known devices and methods for controlling arc energy in switchgear include passive and active systems. Active devices and methods for arc energy control aim to lessen the time or the magnitude of the arc current to control the arc flash energy. Such known active devices and methods seek to lessen the time the arc exists in the switchgear, either by quenching the arc or transporting the arc to an alternative location.

Known active arc controllers absorb arc energy, but require a triggering circuit to create plasma and divert the arc from its fault location in the switchgear to an arc energy absorber. Such known active arc controllers also utilize plasma guns to divert and route arc energy from switchgears to alternate safe locations away from the switchgear. Triggering circuits and plasma guns may add a substantial amount of complexity and cost to such arc controllers. Further, in at least some known active arc control devices and methods, limits on the effectiveness of arc energy absorption limits the internal arc classification (IAC) of low-, medium-, and high-voltage switchgear in both direct current (DC) and alternating current (AC) power systems applications.

BRIEF DESCRIPTION

In one aspect, an arc protection system for an electrical enclosure is provided. The electrical enclosure includes an electrical component positioned in an interior of the electrical enclosure. The arc protection system includes two busbars positioned in the interior of the electrical enclosure. The system also includes an arc containment device coupled to an exterior surface of the electrical enclosure, the arc containment device defining a cavity and including an electrode assembly positioned within the cavity, wherein the electrode assembly is electrically coupled to the two busbars. The system further includes at least one arc routing device having a first end proximate the electrical component and a second end proximate the arc containment device, wherein the at least one arc routing device is operative to i) attract arc plasma generated during an arc event at the electrical component, and ii) transport the arc plasma to the arc containment device, and wherein the arc containment device is configured to transfer electrical energy of the arc plasma to an exterior of the electrical enclosure.

In another aspect, a method of protecting an electrical component in an interior of an electrical enclosure from an arc event occurring at the electrical component is provided. The method includes attracting, using at least one arc routing device, arc plasma generated during the arc event. The method also includes transporting, using the at least one arc routing device, the arc plasma away from the electrical component towards an arc containment device, where the arc containment device is coupled to an exterior surface of the electrical enclosure. The method further includes containing the arc plasma within the arc containment device. The method also includes transferring, using the arc containment device, electrical energy of the arc plasma to an exterior of the electrical enclosure.

In yet another aspect, a method of assembling an arc protection system for an electrical enclosure having an electrical component positioned in an interior of the electrical component is provided. The method includes positioning two busbars within the interior of the electrical enclosure. The method also includes coupling an arc containment device to an exterior surface of the electrical enclosure, the arc containment device defining a cavity and including an electrode assembly positioned within the cavity. The method further includes electrically coupling the electrode assembly to the two busbars. The method also includes positioning at least one arc routing device within the interior, the arc routing device having a first end proximate the electrical component and a second end proximate the arc containment device, wherein the at least one arc routing device is operative to i) attract arc plasma generated during an arc event at the electrical component, and ii) transport the arc plasma to the arc containment device.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, and such ranges are identified and include all the sub-ranges contained therein unless context or language indicates otherwise.

The devices, systems, and methods for active protection of switchgear against internal electrical arc events described herein are suited to mitigating or preventing undesirable effects of arcs in switchgear. The embodiments described herein are also suited to improving the safety of switchgear in the event of arcs therein. The embodiments described herein are further suited to preventing or mitigating damage to switchgear, associated equipment, and surrounding property after an arc event. The devices, systems, and methods for active protection of switchgear against internal electrical arc events described herein are also suited to diverting arcs from switchgear to alternate safe locations without use of triggering circuits and/or plasma guns. The embodiments described above are further suited to quenching arc events in electrical components such as switchgear in less than 2-3 cycles in AC power systems. The embodiments described herein are also suited to enabling effective active arc control in switchgear at a lower level of complexity and cost relative to known active arc controllers. The embodiments described herein are further suited to increasing the internal arc classification (IAC) rating of switchgear of low-, medium-, and high-voltage switchgear in both direct current (DC) and alternating current (AC) power systems applications.

Figure 1:
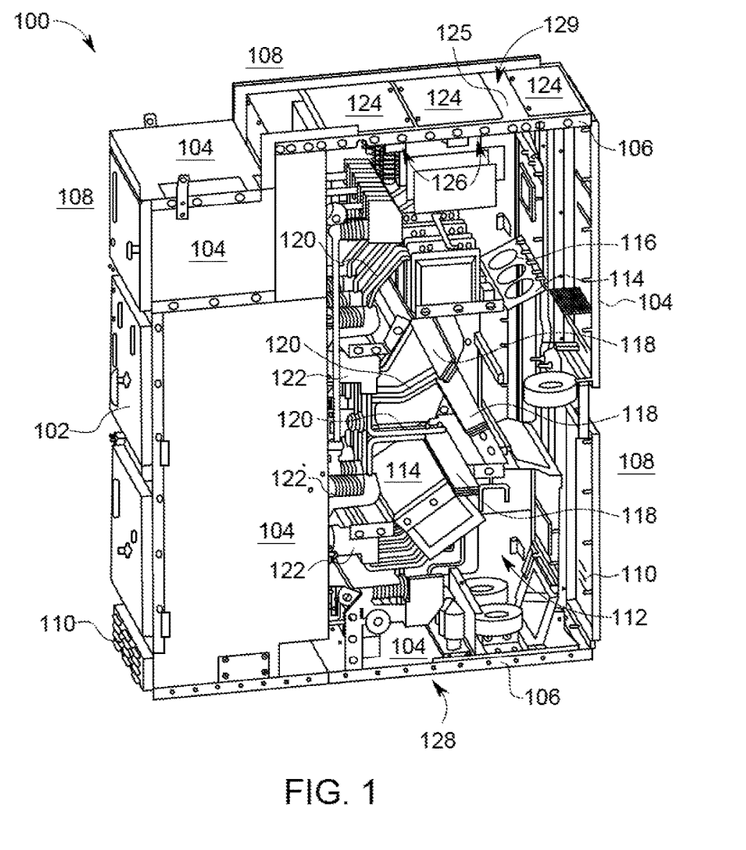
FIG. 1 is a perspective and partial cutaway view of an exemplary embodiment of an electrical enclosure.

FIG. 1 is a perspective and partial cutaway view of an exemplary embodiment of an electrical enclosure, for example switchgear enclosure 100. In the exemplary embodiment, switchgear enclosure 100 includes at least one door 102 which allows access to an interior of switchgear enclosure 100, for example to a circuit breaker panel (not shown). Switchgear enclosure 100 also includes a plurality of metal or metal-clad exterior panels 104 arranged upon and coupled to a plurality of supportive frame members 106, and which provide structural support and protection from conditions present in an external environment 108 outside switchgear enclosure 100. Also, in the exemplary embodiment, switchgear enclosure 100 includes a plurality of covered vents 110 defined in at least one of one or more doors 102 and one or more exterior panels 104. Covered vents 110 facilitate exchange of air from external environment 108 to/from the interior of switchgear enclosure 100 and further facilitate prevention of accumulation of fumes therein (e.g., during an electrical arc event within switchgear enclosure 100).

Also, in the exemplary embodiment, interior of switchgear enclosure 100 includes a plurality of electrical components 112 such as electrical lines, switchgear, switches, connectors, and various other devices necessary to connect electrical load devices to main power lines and circuit breakers. Further, in the exemplary embodiment, interior of switchgear enclosure 100 includes one or more interior panels 114. Interior panel 114 may include one or more apertures 116 defined therethrough. Apertures 116 are configured to perform a number of functions in switchgear enclosure 100 including, without limitation, to facilitate ventilation therein and permit connections between individual electrical components 112 of the plurality of electrical components 112 within switchgear enclosure 100. Apertures 116 are also configured to provide a path through which arc plasma is diverted from an arc event at one or more electrical components 112 to external environment 108 of switchgear enclosure 100, as shown and described below with reference to FIGS. 2 and 5. Among the plurality of electrical components 112 is at least one busbar 118 (two busbars 118 shown in FIG. 1). Busbar 118 is formed of a conductive material such as copper, and transmits a DC or AC electrical current to/from devices and components located in external environment 108, including, without limitation, to/from at least one of one or more additional switchgear enclosures 100 (not shown) and one or more electrical power sources (not shown). Furthermore, in the exemplary embodiment, busbar 118 is uninsulated (i.e., exposed metal) to facilitate exchange and transfer of heat due to electrical current flow in busbar 118. In other embodiments (not shown), all or portions of busbar 118 is insulated.

Further, in the exemplary embodiment, electrical components 112 inside switchgear enclosure 100 include at least one connecting busbar 120 coupled to and between busbar 118 and at least one insulated coupler 122 formed of a nonconductive material such as plastic. Insulated coupler 122 facilitates secure electrical connection between connecting busbars 120 and electrical component 112.

Furthermore, in the exemplary embodiment, switchgear enclosure 100 includes at least one flap 124 coupled to a top panel 125 of switchgear enclosure 100. Flaps 124 cover panel apertures 126 defined through top panel 125. Flaps 124 are configured to expel heat, fumes, arc plasma, gases, and pressure from, and facilitate a general abatement of undesirable physical conditions within, switchgear enclosure 100 which arise in the event of an electrical arc therein. As such, flaps 124 are embodied in rectangular panels coupled to top panel 125 so as to remain in a closed position covering panel aperture 126 during normal operating conditions of switchgear enclosure 100. Moreover, in the exemplary embodiment, flaps 124 are rotatably coupled to top panel 125 including, without limitation, through a hinge on one of four sides of flap 124. Upon a rapid buildup of pressure within the interior of switchgear enclosure 100 (i.e., during an arc event), a force originating in a bottom portion 128 of switchgear enclosure 100 is exerted upon undersides of flaps 124 to uncover panel apertures 126 to facilitate at least one of expulsion of hot gases from switchgear enclosure 100, reduction of pressure within switchgear enclosure 100, and equilibration of pressure within switchgear enclosure 100.

Figure 2:
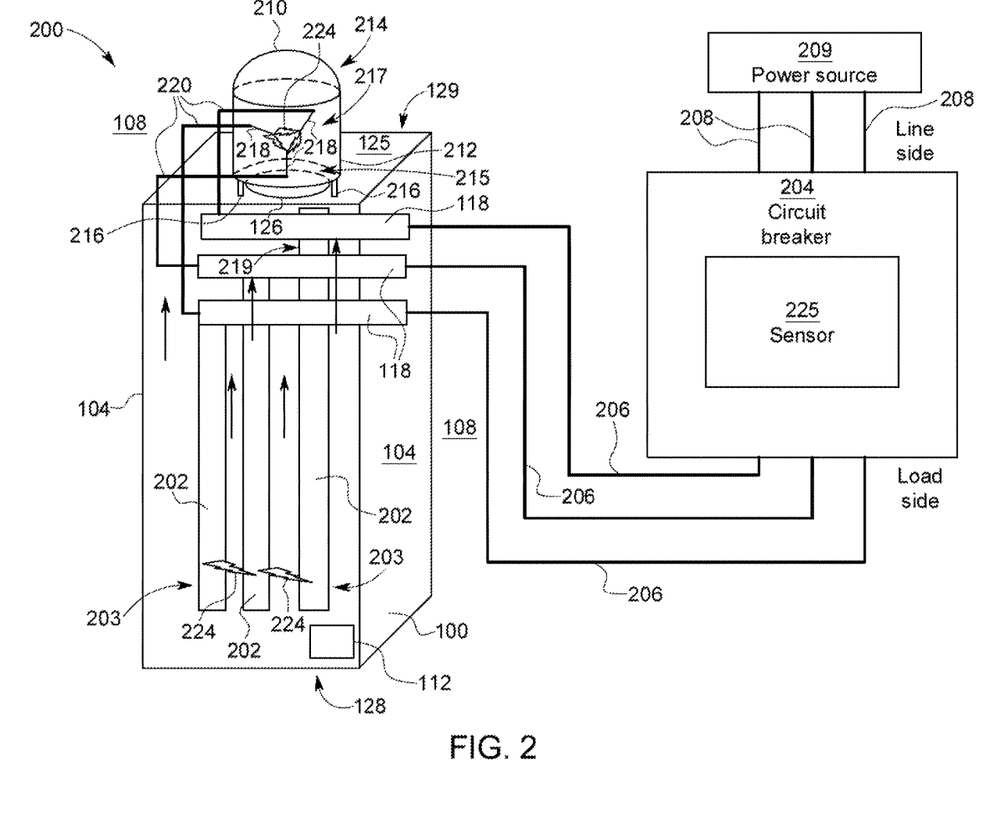
FIG. 2 is a schematic diagram of an exemplary embodiment of an arc protection system that may be used with the electrical enclosure shown in FIG. 1.

FIG. 2 is a schematic diagram of an exemplary embodiment of an arc protection system 200 that may be used with the electrical enclosure (e.g., switchgear enclosure 100) shown in FIG. 1. In the exemplary embodiment, arc protection system 200 includes at least one arc routing device 202 positioned within the interior of switchgear enclosure 100 proximate electrical component 112. In other embodiments (not shown), arc routing device 202 is not positioned within the interior of switchgear enclosure 100 proximate electrical component 112. Arc routing device 202 includes a first end 203 positioned within the interior of switchgear enclosure 100 proximate one or more electrical components 112 to be protected from arc events. In the exemplary embodiment, at least a portion of arc routing device 202 extends through aperture 116 of at least one interior panel 114 (not shown in FIG. 2). In other embodiments (not shown), arc routing device 202 does not extend through aperture 116, but rather extends through portions of switchgear enclosure 100 other than aperture 116 including, without limitation, along exterior panels 104 and through portions of exterior 108. Further, in the exemplary embodiment, arc routing device 202 extends proximate to, but is not coupled to, busbars 118.

Also, in the exemplary embodiment, arc protection system 200 includes at least one circuit breaker 204. Circuit breaker 204 is coupled to and between two sets of electrical power lines: at least one load side power line 206 and at least one line side power line 208. Further, in the exemplary embodiment, load side power line 206 is coupled to busbar 118, and line side power line 208 is coupled to at least one electrical power source 209 including, without limitation, an AC power generator or a DC power supply.

Further, in the exemplary embodiment, arc protection system 200 includes at least one arc containment device 210, also referred to as an arc hat, coupled to a surface 129 of top panel 125 of switchgear enclosure 100. Arc containment device 210 is able to withstand force and pressure exerted thereupon due to effects of arc events within switchgear enclosure 100, as described above with reference to FIG. 1. Arc containment device 210 includes a hollow cylindrical portion 212 and a hollow hemispherical cap portion 214 coupled to hollow cylindrical portion 212 to define a cavity therein. In some embodiments (not shown), at least one of cylindrical portion 212 and cap portion 214 includes vents defined therethrough. In such embodiments, vents further facilitate expulsion of heat, gases, and pressure arising from arc events within switchgear enclosure 100.

Furthermore, in the exemplary embodiment, a base 215 of cylindrical portion 212 is coupled to surface 129 of top panel 125 such that arc containment device 210 is positioned above and over panel aperture 126. Further, in the exemplary embodiment, base 215 is spaced above panel aperture 126 by at least two pegs 216 coupled between surface 129 and base 215. As such, heat, gases, and pressure, due to an arc event inside switchgear enclosure 100, may enter the cavity and be effectively evacuated to exterior environment 108 through a space defined between base 215 and surface 129. In other embodiments (not shown), base 215 contacts top panel 125. In such embodiments, pegs 216 are replaced with at least one bias member, such as at least one spring, coupled between arc containment device 210 and surface 129. Also, in such embodiments, upon an increase in heat, gases, and pressure from an arc event within switchgear enclosure 100, bias members expand and base 215 is raised to facilitate evacuation of heat, gases, and pressure to exterior environment 108 during the arc event.

Moreover, in the exemplary embodiment, arc containment device 210 includes an electrode assembly 217 inside the cavity. Also, in the exemplary embodiment, electrode assembly 217 includes a plurality of electrodes 218 and is formed of a conductive material including, without limitation, metal. Each electrode 218 of the plurality of electrodes 218 is coupled, via an associated electrode line 220, to an associated busbar 118. Electrode lines 220 pass through cylindrical portion 212 to couple to electrodes 218. In other embodiments (not shown) electrode lines 220 may enter the cavity through the space between base 215 and surface 129.

Further, in the exemplary embodiment, a second end 219 of arc routing device 202 is positioned within switchgear enclosure 100 proximate arc containment device 210 and panel aperture 126. In other embodiments (not shown), second end 219 also extends through panel aperture 126 and further extends into the cavity defined within arc containment device 210.

When an arc event occurs at electrical component 112, arc plasma 224 is generated. In operation, in the exemplary embodiment, arc routing device 202 provides a conduit (including, without limitation, at least one of a gaseous link, an electrically conductive link, and a pressure waveguide) for arc plasma 224 generated during an arc event within the interior of switchgear enclosure 100. In the exemplary embodiment, arc routing device 202 is a conductive tubular member including that transports arc plasma 224 from electrical component 112 to second end 219. In other embodiments, arc routing device 202 includes a conductive bar member including, without limitation, a conductive bar member contained within an insulative sleeve. Also, in operation of the exemplary embodiment, arc plasma 224 generated at electrical component 112 is attracted to first end 203 of arc routing device 202. Further, in operation of the exemplary embodiment, upon at least one of contacting and entering first end 202 of arc routing device 202, arc plasma 224 travels at least one of along, through, and between one or more arc routing devices 202 including, for example, by way of a dielectric breakdown of air.

Accordingly, arc routing device 202 substantially lessens the probability that arc plasma will travel to, and negatively affect, other portions of the interior of switchgear enclosure 100. Arc routing device 202 also mitigates negative effects of arc events occurring at electrical component 112 by attracting arc plasma 224 away from electrical component 112, thereby diverting arc plasma 224. For example, in the exemplary embodiment, arc plasma 224 from an arc event arising in a portion of the interior of switchgear enclosure 100 is routed (i.e., transported) along arc routing devices 202 towards panel aperture 126 (as indicated by arrows in FIG. 2). Substantially simultaneously with arc plasma 224 entering arc containment device 210 through panel aperture 126, arc plasma 224 is transported to electrode assembly 217.

Further, in operation of the exemplary embodiment, once arc plasma 224 is transported to electrode assembly 217, ionized gases resulting from arc plasma 224 disrupt the dielectric medium (e.g., air) in gaps between electrode tips (shown and described below with reference to FIGS. 3A-4B). Because electrode assembly 217 is connected to busbars 118 which are connected to load side power lines 206 carrying electrical current from power source 209, ionized gases resulting from arc plasma 224 thus facilitate breakdown of the dielectric medium between electrodes of electrode assembly 217. Furthermore, in operation of the exemplary embodiment, arc plasma 224 is thereby contained in arc containment device 210, rather than within switchgear enclosure 100, and therefore negative effects of arc plasma 224 upon at least one of switchgear enclosure 100, electrical component 121, and devices, components, and personnel proximate thereto are substantially mitigated.

Furthermore, in operation of the exemplary embodiment, arc plasma 224 is contained at electrode assembly 217 in arc containment device 210 rather than inside switchgear enclosure 100 because a first impedance value from power source 209 to electrode assembly 217 is less than a second impedance value from power source 209 to arc routing device 202. Also, given that arc plasma 224 from a single arc event within switchgear enclosure 100 can only be maintained at one location at any given instant in time, arc routing device 202 facilitates transporting arc plasma 224 from its initial location at the arc event to arc containment device 210. Therefore, arc plasma 224 is rapidly removed from the initial location of the arc event (e.g., at electrical component 112) and is substantially simultaneously transported to electrode assembly 217 where it is contained until further operations of arc protection system 200 occur, as described above.

Moreover, in operation of the exemplary embodiment, the aforementioned transport of arc plasma 224 from its source at electrical component 112 to arc containment device 210 also transfers electrical energy including, without limitation, at least one of heat and chemical energy of ionized gases, contained within arc plasma 224 from within switchgear enclosure 100 to at least one of arc containment device 210, electrode assembly 217, and external environment 208. Also, in operation of the exemplary embodiment, substantially simultaneously with transfer of electrical energy of arc plasma 224 to electrode assembly 217, and through the action of the aforementioned dielectric breakdown facilitated by arc plasma 224, an otherwise open circuit loop defined by two or more electrodes 218 coupled through at least two electrode lines 220 to at least two busbars 118 closes. The circuit loop closes via the dielectric breakdown of air (or other media) residing between two or more electrodes 218 of electrode assembly 217, and a flow of electrical current commences therebetween. Dielectric breakdown between two or more electrodes 218 of electrode assembly 217 transfers (i.e., dissipates) electrical energy of the arc event (i.e., by dropping a voltage across the highly resistive air gap between electrodes 218 and, for example releasing heat to external environment 108) to a safe location outside the interior of switchgear enclosure 100.

Also, in operation of the exemplary embodiment, substantially simultaneously with closure of the aforementioned circuit loop, a sensor 225 coupled to at least one of switchgear enclosure 100 and circuit breaker 204 detects an occurrence of the arc event. In the exemplary embodiment, sensor 225 is coupled to circuit breaker 204 and detects at least one of a voltage and a change in voltage of at least a first load side power line 206 with respect to at least a second load side power line 206. Further, in operation of the exemplary embodiment, upon at least one of a voltage and a change in voltage attaining at least one of a value that is equal to a predetermined value and a value that falls outside a predetermined range of values, sensor 225 transmits a signal to circuit breaker 204 to effectuate (i.e., "trip") electrical decoupling of busbars 118 from line side power lines 208. Upon sensor 225-mediated tripping of circuit breaker 204, arc plasma 224 previously contained within arc containment device 210 is rapidly extinguished, and any remaining electrical energy contained within arc plasma 224 will be fully transferred to external environment 208. As such, electrical energy of arc plasma 224 is transferred from electrical component 112 to arc containment device 210, and further transferred from arc containment device 210 to external environment 208 to mitigate negative effects caused by electrical arc events in switchgear enclosure 100.

In other embodiments (not shown), sensor 225 is configured to at least one of measure, monitor, and detect changes in other physical parameters associated with one or more load side power lines 206 including, without limitation, electrical parameters such as a current, a frequency, a phase, a resistance, and an impedance. In still other embodiments (not shown), sensor 225 is an optical sensor positioned inside of at least one of switchgear enclosure 100 and arc containment device 210, and sensor 225 is configured to detect at least one of an arc flash and light emitted from arc plasma 224. In yet other embodiments (not shown), sensor 225 is a temperature sensor positioned within at least one of switchgear enclosure 100, arc containment device 210, and circuit breaker 204, and configured to detect at least one of a change in temperature and a rate of change of temperature (e.g., a temperature increase) due to presence of arc plasma 224. Similarly, in other embodiments (not shown), sensor 225 is at least one of a pressure sensor and a gas composition sensor positioned within at least one of switchgear enclosure 100 and arc containment device 210, and sensor 225 is configured to detect at least one of a change in and a rate of change in at least one of a pressure and a gas composition, respectively, due to presence of arc plasma 224.

Figure 3A:
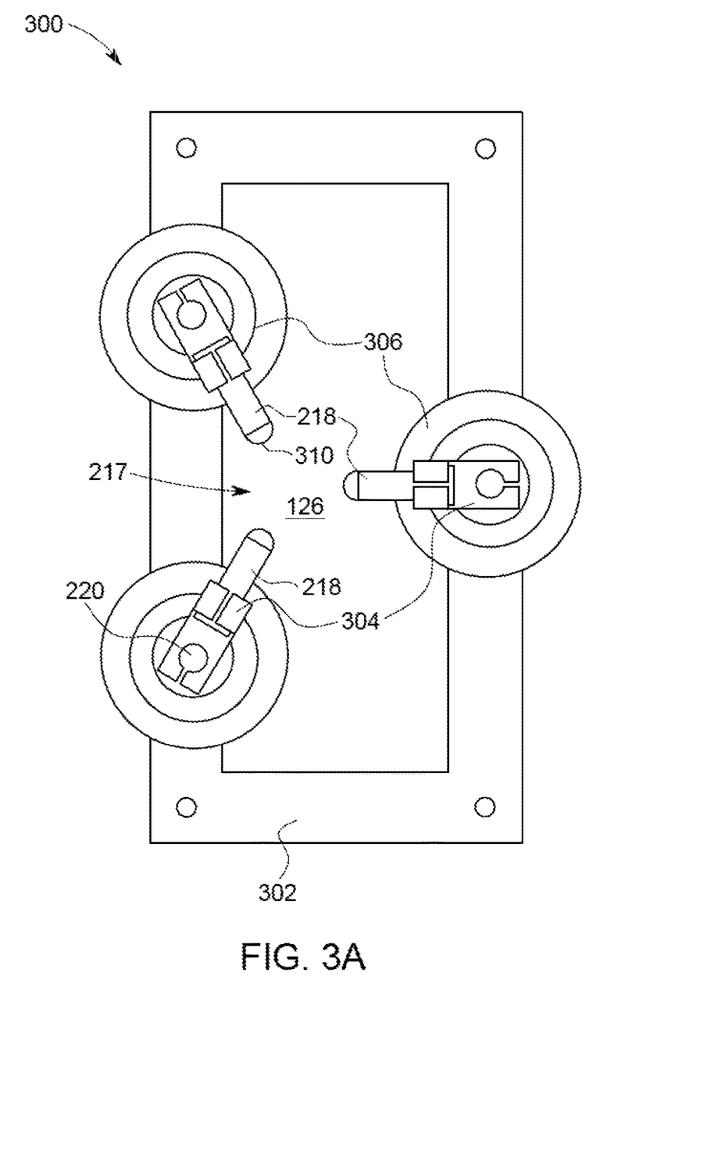
FIG. 3A is a plan view of an exemplary embodiment of an electrode assembly that may be used with the arc protection system shown in FIG. 2.
Figure 3B:
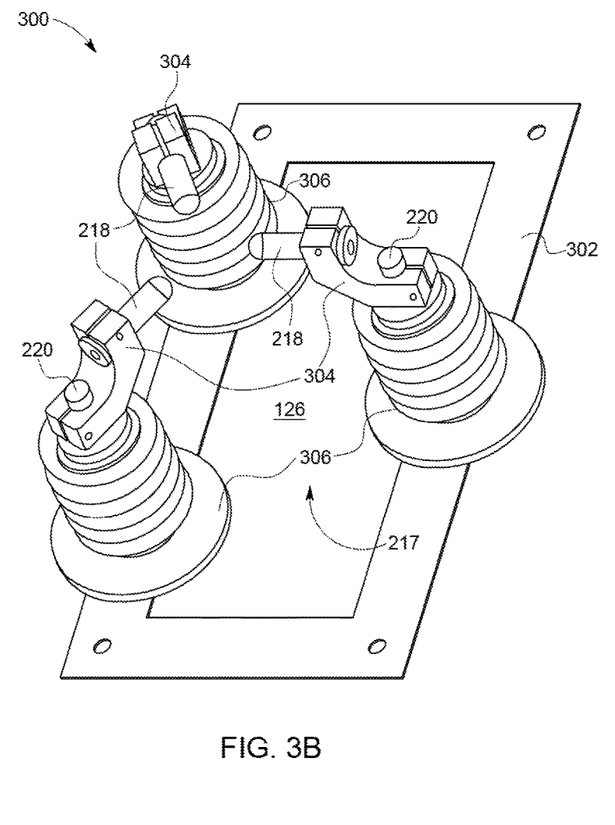
FIG. 3B is a perspective view of the electrode assembly shown in FIG. 3A.

FIG. 3A is a plan view of an exemplary embodiment of an electrode assembly 217, in a star configuration 300, that may be used with arc protection system 200 shown in FIG. 2. FIG. 3B is a perspective view of electrode assembly 217, in star configuration 300, shown in FIG. 3A. In the exemplary embodiment, electrode assembly 217, in star configuration 300, includes a baseplate 302 configured to facilitate coupling electrode assembly 217 to surface 129 of switchgear enclosure 100 (not shown). Also, in the exemplary embodiment, a connector, for example a one-to-one connector 304, is formed of a conductive material such as metal and facilitates coupling one electrode line 220 to one electrode 218. Electrode lines 220 extend above baseplate 302, and are covered by insulative tubes 306 extending between baseplate 302 and one-to-one connector 304. Base plate 302 is positioned upon surface 129 of switchgear enclosure 100 over panel aperture 126 to provide a path through which arc plasma 224 enters arc containment device 210 via arc routing device 202.

Also, in the exemplary embodiment, electrode assembly 217, in a star configuration 300, includes three electrodes 218. Three points defined by tips 310 of electrodes 218 define a substantially equilateral triangle shape. Further, in the exemplary embodiment, electrode assembly 217 is covered by cylindrical portion 212 and hemispherical cap portion 214, as shown and described above with reference to FIG. 2. Also, as shown and described above with reference to FIG. 2, dielectric breakdown of a medium, such as air, present in gaps between tips 310 provides a dissipative path for maintaining arc plasma 224 in response to an arc event within switchgear enclosure 100 (not shown) until such time circuit breaker 204 trips and electrically decouples busbars 118 from line side power lines 208.

Figure 4A:
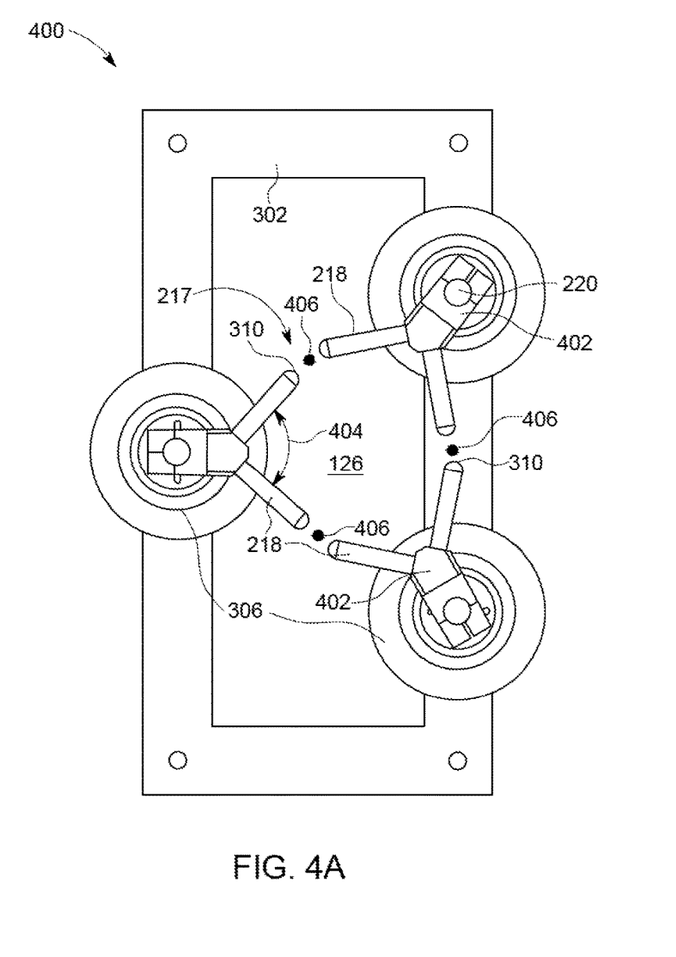
FIG. 4A is a plan view of an alternative embodiment of an electrode assembly that may be used with the arc protection system shown in FIG. 2.
Figure 4B:
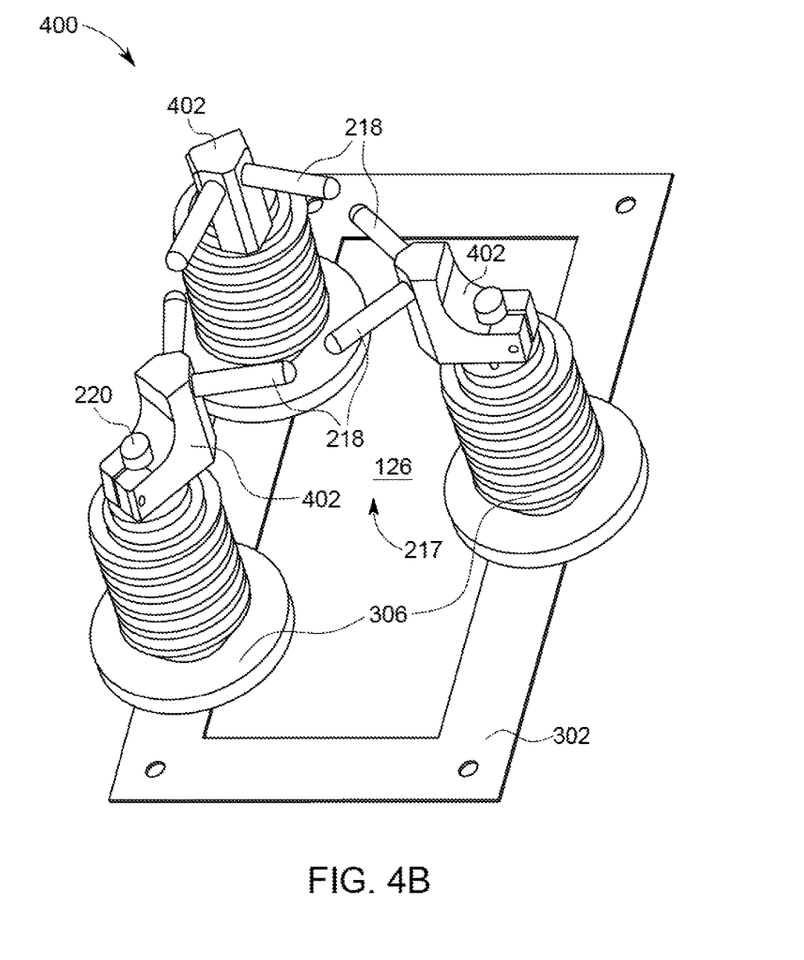
FIG. 4B is a perspective view of the electrode assembly shown in FIG. 4A.

FIG. 4A is a plan view of an alternative embodiment of an electrode assembly 217, in a delta configuration 400, that may be used with arc protection system 200 shown in FIG. 2. FIG. 4B is a perspective view of electrode assembly 217, in delta configuration 400, shown in FIG. 4A. In the alternative embodiment, electrode assembly 217, in delta configuration 400, includes baseplate 302, electrode lines 220, and insulative tubes 306, and is covered by cylindrical portion 212 and hemispherical cap portion 214, as shown and described above with reference to FIGS. 3A and 3B. Also, in the alternative embodiment, a connector, for example a one-to-two connector 402, is formed of a conductive material such as metal and facilitates coupling of one electrode line 220 to two electrodes 218. Base plate 302 is positioned upon surface 129 of switchgear enclosure 100 over panel aperture 126 to provide a path through which arc plasma 224 enters arc containment device 210 via arc routing device 202.

Also, in the alternative embodiment, electrode assembly 217, in a delta configuration 400, includes six electrodes 218. Two electrodes 218 are coupled to each one-to-two connector 402 and oriented with an angle 404 therebetween. Points 406 defined between pairs of tips 310 of adjacent electrodes 218 define a substantially equilateral triangle shape. Also, as shown and described above with reference to FIG. 2, dielectric breakdown of air in gaps between near pairs of tips 310 provide a dissipative path for maintaining arc plasma 224 in response to an arc event within switchgear enclosure 100 (not shown) until such time circuit breaker 204 trips and electrically decouples busbars 118 from line side power lines 208.

Figure 5:
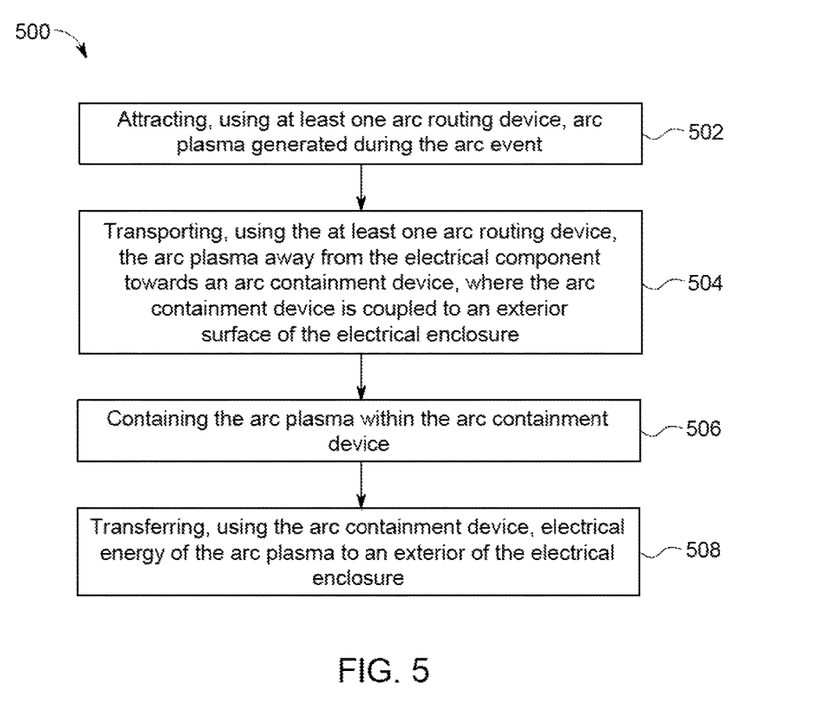
FIG. 5 is a flowchart of an exemplary method of protecting an electrical component from an arc event in an interior of an electrical enclosure that may be used with the arc protection system shown in FIG. 2.

FIG. 5 is a flowchart of an exemplary method 500 of protecting an electrical component (e.g., electrical component 112) from an arc event occurring at the electrical component in an interior of an electrical enclosure (e.g., switchgear enclosure 100), that may be used with arc protection system 200 shown in FIG. 2. Method 500 includes attracting 502, using at least one arc routing device (e.g., arc routing device 202), arc plasma (e.g., arc plasma 224) generated during the arc event. In the exemplary embodiment, arc routing device is not directly coupled to one or more electrical components in the interior of electrical enclosure, but rather is positioned proximate electrical component such that arc plasma is attracted to the arc routing device (as described above with reference to FIG. 2). In other embodiments (not shown), arc routing device (e.g., an electrically conductive arc routing device 202) is coupled to electrical component (e.g., an electrical component 112 having a particularly high propensity to generate arc events).

Method 500 also includes transporting 504, using the at least one arc routing device, the arc plasma away from the electrical component (i.e., where the arc event occurred in electrical enclosure) towards an arc containment device (e.g., arc containment device 210) coupled to an exterior surface of the electrical enclosure (e.g., surface 129 of top panel 125, as shown and described above with reference to FIG. 2). Method 500 further includes containing 506 the arc plasma within the arc containment device. Method 500 also includes transferring 508, using the arc containment device, electrical energy of the arc plasma to an exterior (e.g., external environment 108) of the electrical enclosure.

Figure 6:
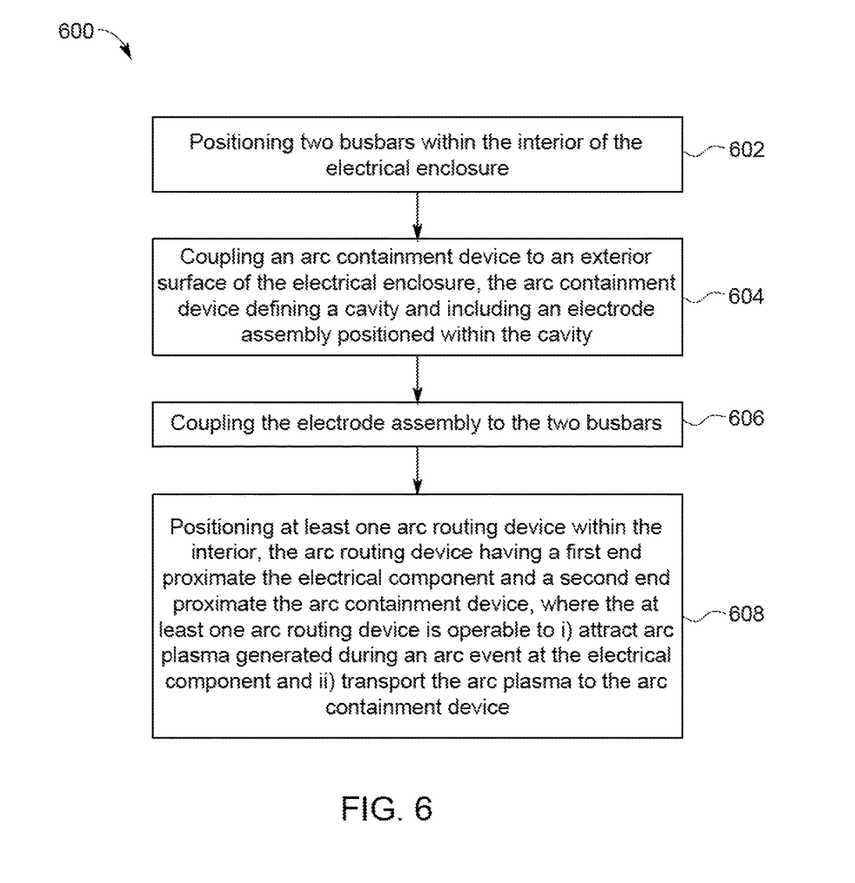
FIG. 6 is a flowchart of an exemplary method of assembling an arc protection system that may be used with the electrical enclosure shown in FIG. 1.

FIG. 6 is a flowchart of an exemplary method 600 of assembling an arc protection system 200 that may be used with the electrical enclosure shown in FIG. 1 (e.g., switchgear enclosure 100). The electrical enclosure includes an electrical component (e.g., electrical component 112) positioned in an interior of the electrical enclosure. Method 600 includes positioning 602 at least two busbars (e.g., busbars 118), within the interior of the electrical enclosure (e.g., as shown and described above with reference to FIGS. 2 and 3). Method 600 also includes coupling 604 an arc containment device (e.g., arc containment device 210) to an exterior surface (e.g., surface 129 of top panel 125) of the electrical enclosure, the arc containment device defining a cavity and including an electrode assembly (e.g., electrode assembly 217) positioned within the cavity. Method 600 further includes electrically coupling 606 the electrode assembly to the two busbars (e.g., as shown and described above with reference to FIG. 2). Method 600 also includes positioning 608 at least one arc routing device (e.g., example arc routing device 202) within the interior of the electrical enclosure, the arc routing device having a first end (e.g., first end 203) proximate the electrical component and a second end (e.g., second end 219) proximate arc containment device. The at least one arc routing device is operable to attract arc plasma (e.g., arc plasma 224) generated during an arc event at the electrical component, and transport the arc plasma to the arc containment device.

As shown and described above with reference to FIGS. 1, 2, and 5, in the exemplary embodiment, positioning 608 does not include coupling at least one arc routing device to the electrical component. In other embodiments (not shown), positioning 608 includes coupling at least one arc routing device 202 to electrical component 112 (e.g., an electrically conductive arc routing device 202 coupled to an electrical component 112 having a particularly high propensity to generate arc events).

The above-described devices, systems, and methods for active protection of switchgear against internal electrical arc events are suited to mitigating or preventing undesirable effects of arcs in switchgear. The above-described embodiments are also suited to improving the safety of switchgear in the event of arcs therein. The above-described embodiments are further suited to preventing or mitigating damage to switchgear, associated equipment, and surrounding property after an arc event. The above-described devices, systems, and methods for active protection of switchgear against internal electrical arc events are also suited to diverting arcs from switchgear to alternate safe locations without use of triggering circuits and/or plasma guns. The embodiments described above are further suited to quenching arc events in electrical components such as switchgear in less than 2-3 cycles in AC power systems. The above-described embodiments are also suited to enabling effective active arc control in switchgear at a lower level of complexity and cost relative to known active arc controllers. The above-described embodiments are further suited to increasing the IAC rating of low-, medium-, and high-voltage switchgear in both DC and AC power systems applications.

Exemplary embodiments of the above-described devices, systems, and methods for active protection of switchgear against internal electrical arc events are not limited to the specific embodiments described herein, but rather, components of systems and/or steps of the methods may be utilized independently and separately from other components and/or steps described herein. For example, the methods, systems, and apparatus may also be used in combination with other systems requiring protection from internal electrical arc events, and the associated methods are not limited to practice with only the systems and methods as described herein. Rather, the exemplary embodiments can be implemented and utilized in connection with many other applications, equipment, and systems that may benefit from using the above-described embodiments of the devices, systems, and methods for active protection of switchgear against internal electrical arc events to improve the safety and reliability of operation for devices and equipment other than switchgear in electrical power systems and other related systems in various applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An arc protection system for an electrical enclosure having an electrical component positioned in an interior of the electrical enclosure, said system comprising:
    two busbars positioned in the interior of the electrical enclosure;
    an arc containment device coupled to an exterior surface of the electrical enclosure, said arc containment device defining a cavity and comprising an electrode assembly positioned within the cavity, wherein the electrode assembly is electrically coupled to said two busbars; and
    at least one arc routing device comprising a first end proximate the electrical component and a second end proximate the arc containment device, wherein said at least one arc routing device is operative to i) attract arc plasma generated during an arc event at the electrical component, and ii) transport the arc plasma to said arc containment device, and wherein said arc containment device is configured to transfer electrical energy of the arc plasma to an exterior of the electrical enclosure.

2. An arc protection system in accordance with claim 1, wherein said at least one arc routing device comprises one of i) a conductive tube and ii) a conductive bar within an insulative sleeve.

3. An arc protection system in accordance with claim 1, wherein said two busbars are coupled to at least one of a power source and an additional electrical enclosure.

4. An arc protection system in accordance with claim 1, wherein said arc containment device is coupled to the exterior surface using a plurality of pegs that space said arc containment device from the exterior surface.

5. An arc protection system in accordance with claim 1, wherein said arc containment device is coupled to the exterior surface using a plurality of bias members.

6. An arc protection system in accordance with claim 1, wherein said electrode assembly comprises a plurality of electrodes.

7. An arc protection system in accordance with claim 6, wherein each electrode of said plurality of electrodes includes a tip, each tip electrically isolated from the remaining tips by a gap that contains a medium.

8. An arc protection system in accordance with claim 7, wherein a dielectric breakdown of the medium occurs when a voltage across the gap reaches a breakdown voltage value.

9. A method of protecting an electrical component in an interior of an electrical enclosure from an arc event occurring at the electrical component, said method comprising:
    attracting, using at least one arc routing device, arc plasma generated during the arc event;
    transporting, using the at least one arc routing device, the arc plasma away from the electrical component towards an arc containment device, wherein the arc containment device is coupled to an exterior surface of the electrical enclosure;
    containing the arc plasma within the arc containment device; and
    transferring, using the arc containment device, electrical energy of the arc plasma to an exterior of the electrical enclosure.

10. A method in accordance with claim 9, wherein transporting the arc plasma comprises transporting the arc plasma to an electrode assembly of the arc containment device.

11. A method in accordance with claim 9, wherein attracting arc plasma comprises attracting the arc plasma using at least one arc routing device that includes one of i) a conductive tube and ii) an insulative sleeve.

12. A method in accordance with claim 9 further comprising:
    detecting, using a sensor, an occurrence of the arc event; and
    disabling a flow of electrical current from a power source to the electrical enclosure.

13. A method in accordance with claim 9, wherein transporting the arc plasma comprises transporting the arc plasma to an arc containment device that is coupled to the exterior surface using a plurality of pegs that space the arc containment device from the exterior surface.

14. A method in accordance with claim 9, wherein transporting the arc plasma comprises transporting the arc plasma to an arc containment device that is coupled to the exterior surface using a plurality of bias members.

15. A method of assembling an arc protection system for an electrical enclosure having an electrical component positioned in an interior of the electrical enclosure, said method comprising:
    positioning two busbars within the interior of the electrical enclosure;
    coupling an arc containment device to an exterior surface of the electrical enclosure, the arc containment device defining a cavity and including an electrode assembly positioned within the cavity;
    electrically coupling the electrode assembly to the two busbars; and
    positioning at least one arc routing device within the interior, the arc routing device having a first end proximate the electrical component and a second end proximate the arc containment device, wherein the at least one arc routing device is operative to i) attract arc plasma generated during an arc event at the electrical component, and ii) transport the arc plasma to the arc containment device.

16. A method in accordance with claim 15 further comprising defining a panel aperture through the exterior surface, and wherein coupling the arc containment device to the exterior surface comprises positioning the arc containment device over the panel aperture.

17. A method in accordance with claim 15, wherein positioning at least one arc routing device comprises positioning at least one arc routing device that includes one of i) a conductive tube and ii) a conductive bar within an insulative sleeve.

18. A method in accordance with claim 15 further comprising coupling the two busbars to at least one of a power source and an additional electrical enclosure.

19. A method in accordance with claim 15, wherein coupling an arc containment device comprises coupling the arc containment device to the exterior surface using a plurality of pegs that space the arc containment device from the exterior surface.

20. A method in accordance with claim 15, wherein coupling an arc containment device comprises coupling the arc containment device to the exterior surface using a plurality of bias members.

* * * * *